US012748654B2

(12) United States Patent
Benisty et al.

(10) Patent No.: US 12,748,654 B2
(45) Date of Patent: Sep. 29, 2026

(54) SELECTIVE PANIC MITIGATION

(71) Applicant: Sandisk Technologies, Inc., Milpitas, CA (US)

(72) Inventors: Shay Benisty, Beer Sheva (IL); Ariel Navon, Revava (IL); Judah Gamliel Hahn, Ofra (IL); Alexander Bazarsky, Holon (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/938,733

(22) Filed: Nov. 6, 2024

(65) Prior Publication Data

US 2026/0127067 A1 May 7, 2026

(51) Int. Cl.
*G06F 11/07* (2006.01)
*G06F 11/14* (2026.01)

(52) U.S. Cl.
CPC ...... *G06F 11/0793* (2013.01); *G06F 11/0712* (2013.01); *G06F 11/1441* (2013.01)

(58) Field of Classification Search
CPC ............. G06F 11/0712; G06F 11/0727; G06F 11/0793; G06F 11/1441; G06F 11/1438; G06F 11/1415; G06F 1/24; G06F 9/45558; G06F 2009/45575; G06F 2009/45587; G06F 2009/45591
See application file for complete search history.

(56) References Cited

U.S. PATENT DOCUMENTS 6,735,720 B1 5/2004 Dunn et al.
7,284,149 B1 10/2007 Fisher et al.
10,908,998 B2 2/2021 Ding et al.
11,157,439 B2 10/2021 Hahn et al.
11,953,976 B2 4/2024 Ozturk et al.
11,971,789 B2 4/2024 Siluvainathan
11,994,951 B2 5/2024 Hanna
2004/0210793 A1* 10/2004 Chokshi .............. G06F 11/0712 714/E11.023
2011/0202797 A1* 8/2011 Mezhibovsky ........... G06F 1/24 714/24
2013/0254586 A1* 9/2013 Winger ............... G06F 11/0742 714/E11.138
2014/0380028 A1* 12/2014 Cheng ................. G06F 9/45533 713/1
2015/0220413 A1* 8/2015 Hindi .................. G06F 11/1471 714/6.23
2017/0168747 A1 6/2017 Han et al.
2021/0406111 A1* 12/2021 Bollu .................. G06F 11/0712
2023/0205287 A1* 6/2023 Jiang ......................... G06F 1/24 713/1

FOREIGN PATENT DOCUMENTS

WO 2024036473 A1 2/2024

* cited by examiner

*Primary Examiner* — Gabriel Chu
(74) *Attorney, Agent, or Firm* — Patterson + Sheridan, LLP

(57) ABSTRACT

Not all panic situations in a data storage device necessitate a host device initiated reset. When it is possible for the data storage device to handle a panic event and simply inform the host device that the panic event was avoided, efficiencies are achieved. For multi-tenant situations, the data storage device can track the types of traces and determine whether a host device initiated reset is necessary or whether the data storage device can handle the reset internally. The data storage device can delay a host device initiated reset needed by one tenant until other tenants are ready for the host device initiated reset.

13 Claims, 8 Drawing Sheets

SELECTIVE PANIC MITIGATION

BACKGROUND OF THE DISCLOSURE

Field of the Disclosure

Embodiments of the present disclosure generally relate to panic mitigation.

Description of the Related Art

The peripheral component interconnect (PCI) express (PCIe) standard introduces a single root input/output (I/O) virtualization (SR-IOV) that includes physical functions (PFs) and virtual functions (VFs). PFs are full featured PCIe functions. VFs are lightweight functions that lack some configuration resources.

A multi-tenant environment typically means that there is some kind of virtualization implemented in the device controller such as one or more VFs, one or more PFs, or combinations thereof. Most specifically, a multi-tenant environment involves multiple functions.

When a data storage device encounters an internal failure, the data storage device has several recovery paths. Some failures can be handled within the data storage device, and some involve resetting the host interface or otherwise disrupting host-device communication. Events that involve host device interactions are called panic events. There are mechanisms in the nonvolatile memory (NVM) express (NVMe) and open compute project (OCP) standards to address panic events while minimizing impact to end-users.

Regardless of whether operating in a client or an enterprise solid state drive (SSD) environment, reducing the frequency of panic events would be valuable to avoid disrupting the host interface wherever possible.

Therefore, there is a need in the art for mitigating panic events.

SUMMARY OF THE DISCLOSURE

Not all panic situations in a data storage device necessitate a host device initiated reset. When it is possible for the data storage device to handle a panic event and simply inform the host device that the panic event was avoided, efficiencies are achieved. For multi-tenant situations, the data storage device can track the types of traces and determine whether a host device initiated reset is necessary or whether the data storage device can handle the reset internally. The data storage device can delay a host device initiated reset needed by one tenant until other tenants are ready for the host device initiated reset.

In one embodiment, a data storage device comprises: a memory device; and a controller coupled to the memory device, wherein the controller is configured to: track an indication for reset for one or more physical functions (PFs), one or more virtual functions (VFs), or a combination of PFs and VFs; determine whether a reset is to occur; determine whether a workload is a read workload; and determine whether to handle a reset internally or turn to a host device to initiate a reset.

In another embodiment, a data storage device comprises: a memory device; and a controller coupled to the memory device, wherein the controller is configured to: operate as a multitenant device coupled to one or more physical functions (PFs), one or more virtual functions (VFs), or a combination of PFs and VFs; track traces for each function of the one or more PFs, the one or more VFs, or the combination of PFs and VFs; determine whether the traces are for a read workload; and store an indication of whether the workload is a read workload.

In another embodiment, a data storage device comprises: means to store data; and a controller coupled to the means to store data, wherein the controller is configured to: determine that a near failure event has occurred; determine that the near failure event can be handled without host device reset; initiate host device isolation; handle state reset; restore system state from a state recovery database; and remove host device isolation.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Not all panic situations in a data storage device necessitate a host device initiated reset. When it is possible for the data storage device to handle a panic event and simply inform the host device that the panic event was avoided, efficiencies are achieved. For multi-tenant situations, the data storage device can track the types of traces and determine whether a host device initiated reset is necessary or whether the data storage device can handle the reset internally. The data storage device can delay a host device initiated reset needed by one tenant until other tenants are ready for the host device initiated reset.

Figure 1:
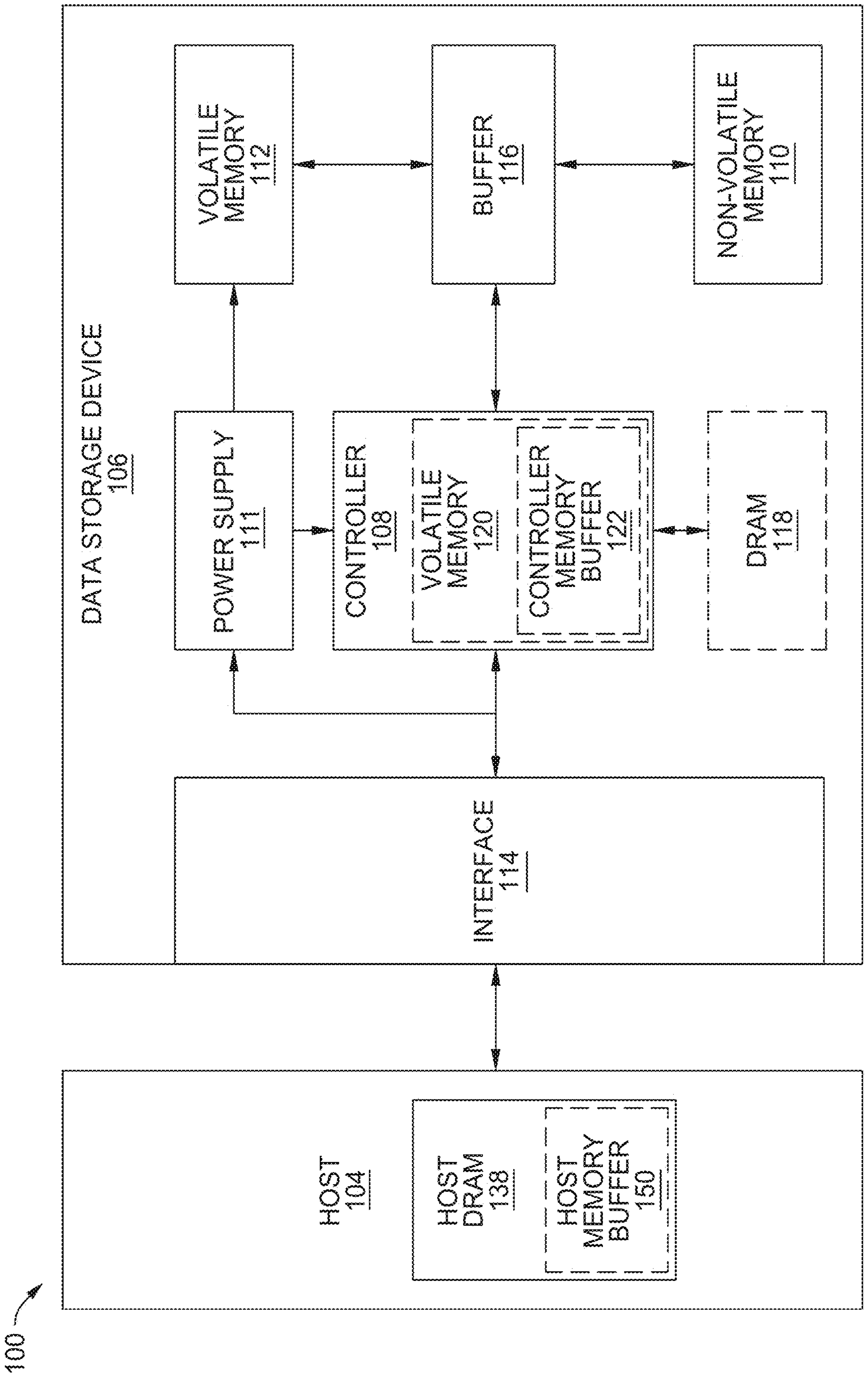
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called “smart” phones, so-called “smart” pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. Controller 108 may include circuitry or processors configured to execute programs for operating the data storage device 106.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

When a panic event is avoided, the issue can still be reported to the host device via a telemetry interface to notify the host device that a panic event was averted, but that an issue should still be investigated. Logs provided via telemetry can be collected and returned to the storage supplier for triage. The instant disclosure describes mechanisms by which a device-internal reset can be implemented in situations that currently involve a host device reset, thus converting panic conditions into notifications.

Previously, the system state would not be written to the memory, and in many failure events the data storage device would rely on a host device reset in order to restore the state. The disruption not only affects the immediate user but also potentially impacts the overall efficiency and productivity of the data storage device or system. Such scenarios should be minimized.

Figure 2:
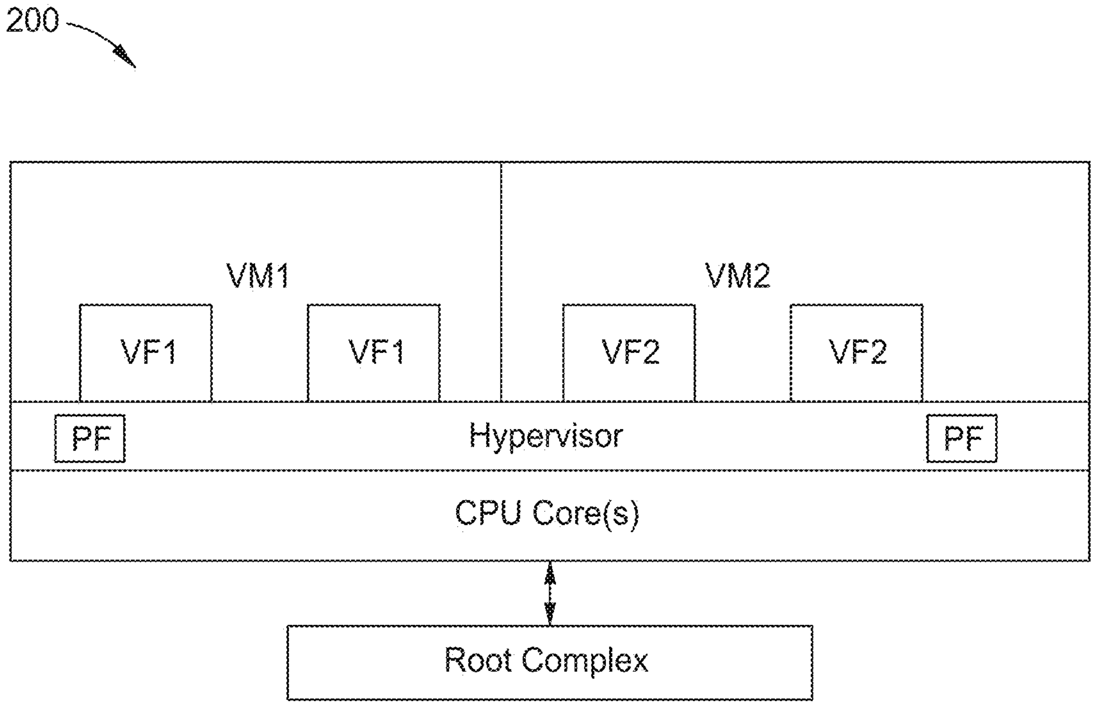
FIG. 2 is a block scheme depicting a standard introduces a single root input/output (I/O) virtualization (SR-IOV) system.

FIG. 2 is a block scheme 200 depicting a standard introduces a single root input/output (I/O) virtualization (SR-IOV) system. FIG. 2 illustrates multiple virtual machines, multiple virtual functions (VFs) and also physical functions (PFs). In a generic scenario, there might be a several PFs and also multiple VFs. There is also a root complex shown and the remainder of the system.

SR-IOV allows a PCIe device to appear to be multiple PCIe devices. The NVMe standard includes support for SR-IOV, allowing multiple virtual controllers to address the same media pool. This has use cases in enterprise compute and automotive storage. These use cases are collectively referred to as multi-tenancy where each tenant is a VF or PF that has access to what appears to be a full storage device but is actually a sandboxed and limited representation of part of the overall storage.

The other part of the disclosure is related to handling of panic events at the data storage devices. Panic events occur when something bad has happened internally in the data storage device. Examples of panic events include extreme heat, errors in the flash, etc. The data storage device will need to recover from the panic events. There are two kinds of recovery, host device initiated resets and recovery without host device intervention.

For host device initiated resets, the data storage device just informs the host device that the data storage device is stuck and needs resetting. Most users prefer to avoid resets or to at least minimize resets in the system. Therefore, even though failures may be detected, if would be preferable to avoid resets. Rather than performing a reset, one option is to handle the panic event internally in the data storage device without host device intervention. If a panic event is detected, and there really isn't a need to have the host device intervene, then the situation is preferred. The host device can be updated, but with no functional expectation from the host device. When there is a single host device that interacts with the data storage device, the process is rather simple, but as discussed herein, when there is a multi-tenant device, there will be some complexity.

When a data storage device encounters an internal failure, the data storage device has a number of recovery paths. Some failures can be handled within the data storage device, and some involve resetting the host interface or otherwise disrupting host-device communication. While there are mechanisms in the NVMe and OCP standards to address panic events while minimizing impact to end-users, as noted above, some users, in both client and enterprise SSD, prefer to reduce the frequency of panic events and find creative ways to avoid disrupting the host device interface wherever possible.

When a panic event is avoided, the issue can still be reported to the host device as noted above via the telemetry interface. The notification notifies the host device that a panic was averted, but that an issue should still be investigated. Logs provided via telemetry can be collected and returned to the storage supplier for triage.

Previously, mechanisms by which a device-internal reset can be implemented in situations that currently require a host device reset convert panic conditions into notifications. By that, the host device interaction is reduced by decreasing the number of resets that require the explicit host device involvement. In case of failure, the system will be able to restore the system state and continue operation.

Storage systems that are connected to a single host (physical or virtual) are simple. Multi-tenant systems (which includes either single PCIe port with several VFs/PFs, or a standard multi-host system with several PCIe ports) have additional challenges. Some of the host devices may be read-intensive and thus qualify for the solution of an internal reset, while other host devices have more complex workloads which require a host device initiated reset.

The standard state-of the-art solution to memory device reset is dictated by the fact that the system state would not be written to the memory. In many failure events, the storage system relies on a host device reset in order to restore the state. The disruption not only affects the immediate user but also potentially impacts the overall efficiency and productivity of the device or system. As noted above, some end users desire minimizing those scenarios.

A single interface system uses a hardware log which records parameters in the front-end state while the data storage device is operational and running correctly. When the data storage device detects an internal failure, the data storage device rolls back the state to the last known good configuration, essentially aborting in-flight commands that were not completed or acknowledged. The data storage device then continues from the last known good configuration.

The primary difference between a panic event and a warning noted in telemetry is the need to reset the host interface. Typically, the host interface needs to be reset during a panic event as part of returning the interface to a known state following a failure. As will be discussed below, many of the issues can be isolated to allow an internal reset to return the interface to a known state without requiring host device intervention.

While applicable to a number of interface protocols, the description focuses on PCIe/NVMe to illustrate the implementation. A candidate protocol that can benefit from the disclosure may have the following characteristics: device bus mastering to allow silent restart of aborted command; queue architecture where command execution is device-initiated and the host device is not aware of when a command begins execution; and decoupled logical and physical protocols where a failure in NVMe does not necessarily require a link restart.

A hardware log is used which records parameters in the front-end state while the data storage device is operational and running correctly. When the data storage device detects an internal failure, the data storage device rolls back the state to the last known good configuration, essentially aborting in-flight commands that were not completed or acknowledged. The data storage device then continues from the last known good configuration.

Figure 3:
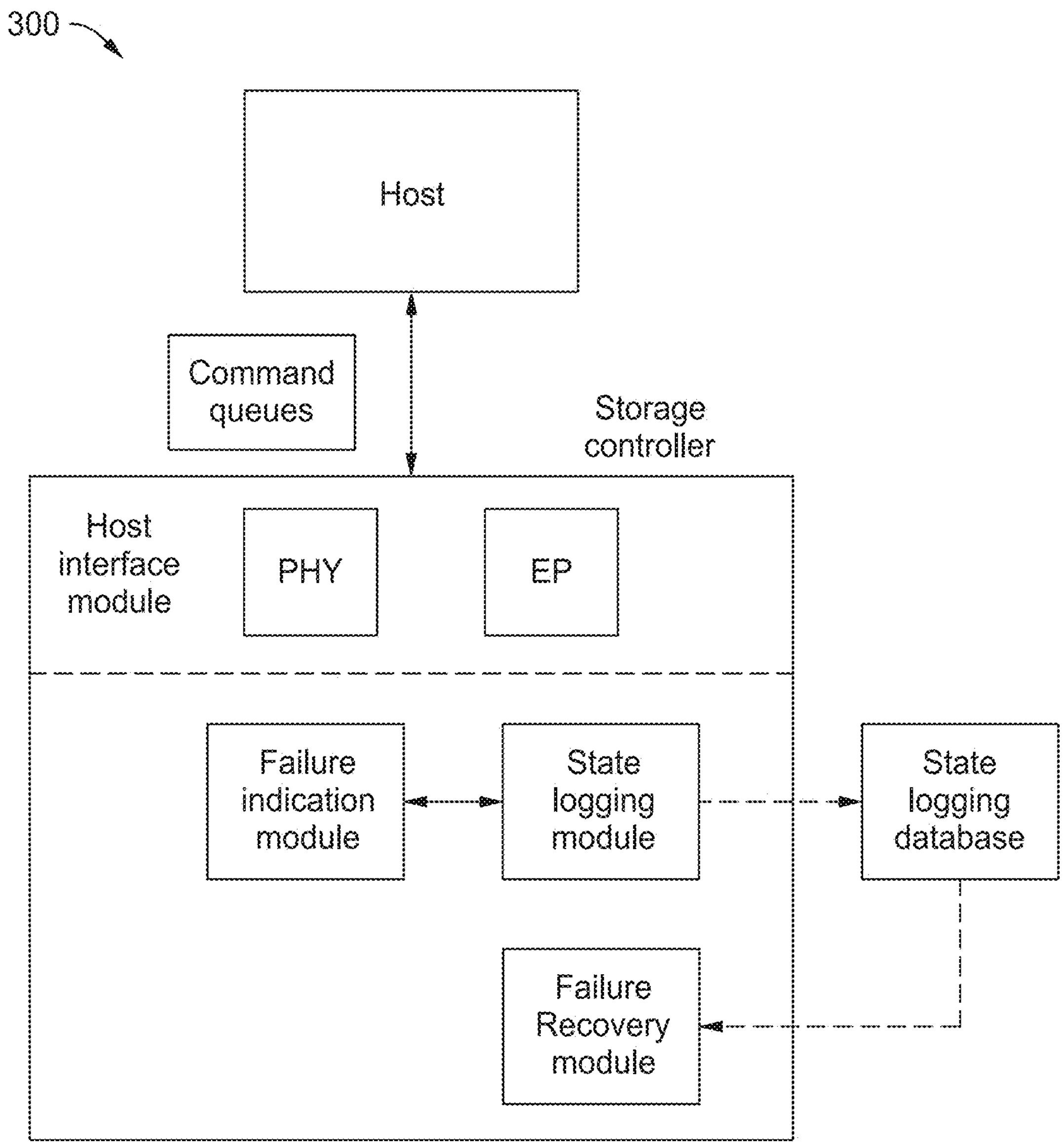
FIG. 3 is a schematic illustration of an internal reset for a single port memory device.

FIG. 3 is a schematic illustration 300 of a block diagram for an internal reset for a single port memory device. FIG. 3 illustrates a host device and the interface between the host device and the data storage device. In NVMe, there are command queues as well as numerous other items. In the data storage device controller there is the HIM, the physical interface (PHY), the endpoint (EP) or the Mac, as well as other components not shown. There is also a failure indication model, a failure detector model that updates the failure indication model on failures, a state logging module that from time to time is responsible for capturing the current state of the host device, and a failure recovery module. The state logging module is responsible for determining the current state of the interface between the host device and the data storage device. The logging may be stored in the flash and whenever recovery from a failure is needed and there is a desire to avoid having host device involvement. Generally speaking, the data storage device takes the latest update in the state logging module and recovers from there. The concept is more related to read extensive workload because if there is a write command, it would be very difficult to manage the write command because the host device expects the previous write operation will eventually be written to the memory device.

The failure indication module, which is added to the controller, is to monitor the current controller conditions, and in case that any indication to a failure event is observed, check whether the failure can be handled without a host reset.

Not all commands can be rolled back during failure recovery. If a command is in-flight or was recently processed, the command may trigger the need for a host-assisted recovery and a panic event. Some examples include: acknowledged write commands, DSM commands, and admin commands that change device state. For acknowledged write commands, once a write command is acknowledged, the host-side memory buffer is released and the write cannot be restarted without additional host involvement. For DSM commands (trim/unmap), a DSM command that is executed will destroy data. If an interleaved write command may have been completed after a DSM, rolling back and re-executing the DSM can lead to data loss. Under those circumstances, a panic event should be triggered. For admin commands that change device state, admin commands are typically handled orthogonally, while I/O commands are being processed in parallel. If an admin command will change the device state, the admin command may lead to complex interactions with restarted I/O commands.

Figure 4:
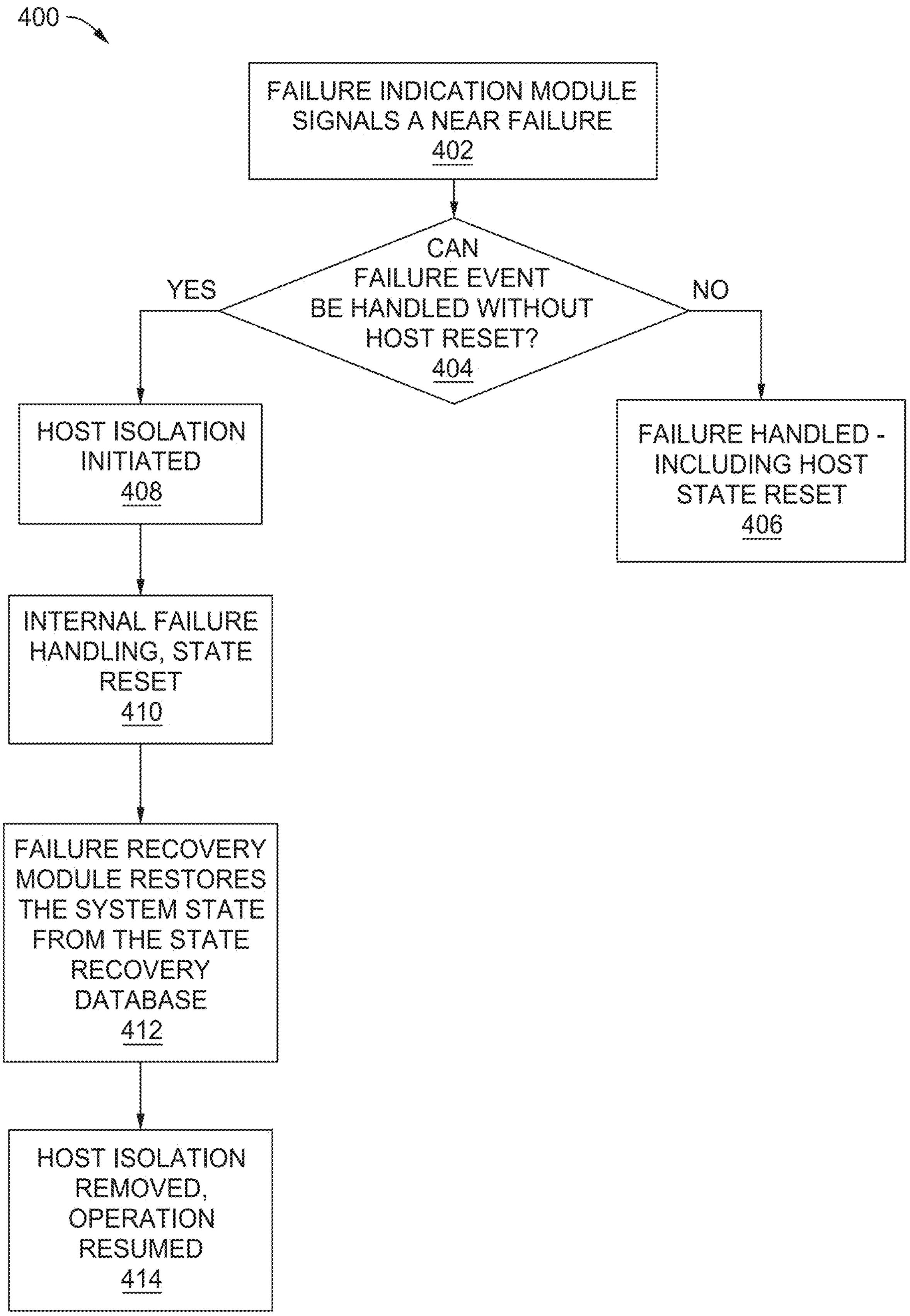
FIG. 4 is a flowchart illustrating handling of failure events according to one embodiment.

FIG. 4 is a flowchart 400 illustrating handling of failure events according to one embodiment. Initially, a failure indication module signals that a near failure event has occurred at block 402. A determination is then made regarding whether the failure event can be handled without host device intervention by way of a reset at block 404. If the failure even cannot be handled without a host device intervention, then the failure will be handled with a host state reset at block 406. However, if the failure event can be handled without a host device reset, then the host device isolation is initiated at block 408 followed by internal failure handling and state reset at block 410. The failure recovery module restores the system state from the state recovery database at block 412 and the host device isolation is removed and normal operation is resumed at block 414.

The failure indication module may also include listening to assertion mechanism. If certain assertions are set, the failure indication module may indicate to the state logging module to record the state. In order to avoid problems related to the failure event processing, the dedicated memory for the state logging may have a separate reset domain from the other memory parts. This is indicated inside the storage controller by the bold dotted lines in FIG. 3. Even if parts of the memory are reset during the process of failure event, the state logging memory domain should not be affected so that the host queue handling can be resumed after failure event handling is over. The state logging database should contain the minimum information that is needed to recover the system state after an internal reset. The information may contain the queue pointers, pending CID in the device that the host device has submitted, but data storage device hasn't completed yet, and other information.

Figure 5:
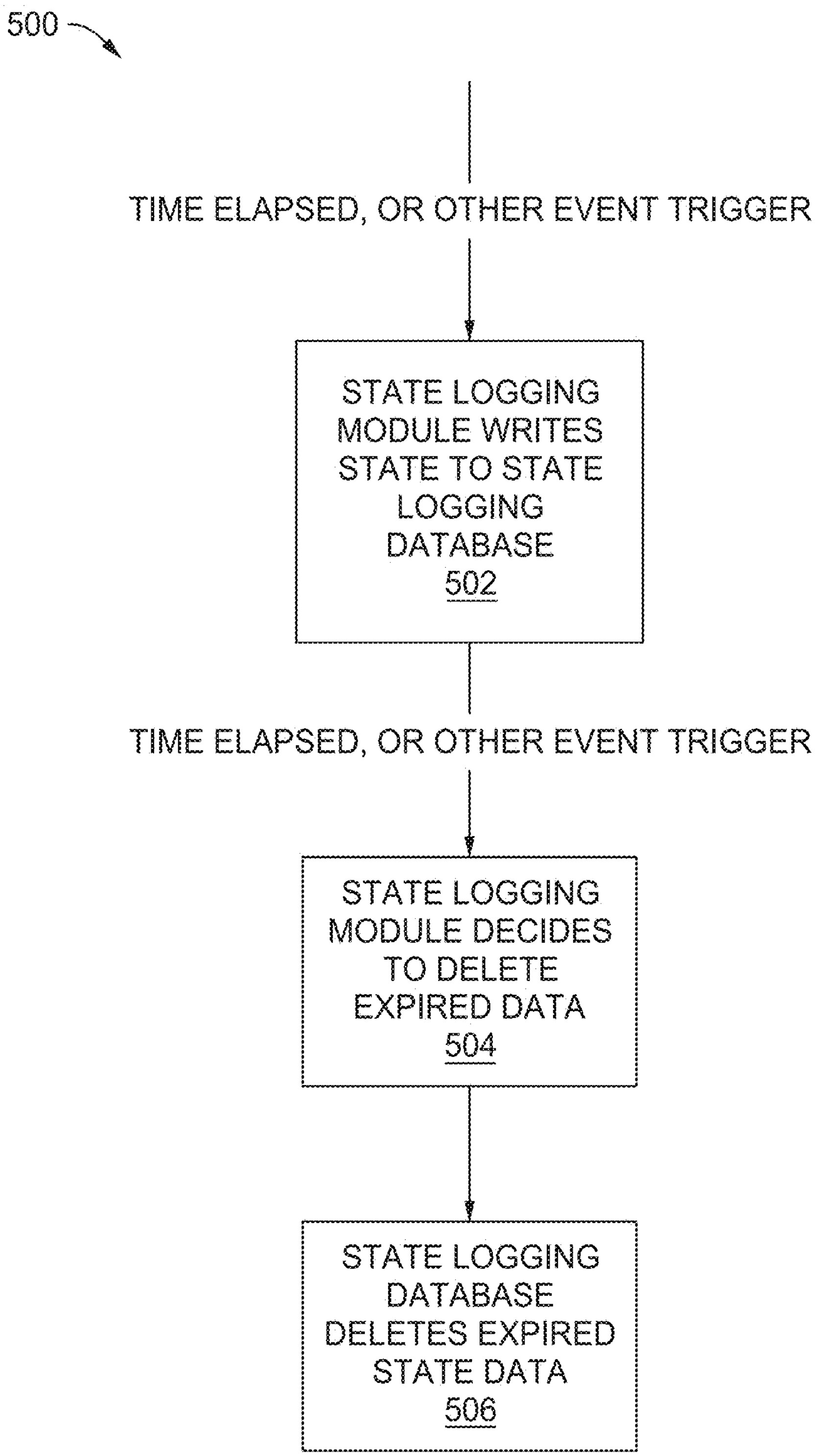
FIG. 5 is a flowchart illustrating the state logging module and database operation according to one embodiment.

The operation of the state logging module is described in FIG. 5. FIG. 5 is a flowchart 500 illustrating the state logging module and database operation according to one embodiment. The state logging module will write the state parameters to the state logging database at block 502 when a certain time threshold elapses, or when some event triggers the operation, like a new host command arrival. The state logging module decides to delete the expired data at block 504 after a predetermined period of time has elapsed or some other trigger event has occurred. The data in the database is deleted when it has expired at block 506.

To address multi-tenant panic handling, a combination of internal resets and host-triggered panic mitigation is utilized. The concept allows reduction of the overall host device involvement in reset for multi-tenant use cases. The concept is to coordinate and synchronize combined internal and external reset operations of different tenants. The idea is to selectively adapt the reset of the different tenants to either an inter-device or an external host device operated reset operation (according to the typical and current workloads of that tenant), and then synchronize the execution of the reset of the rest of the tenants and the administrative function itself.

Figure 6:
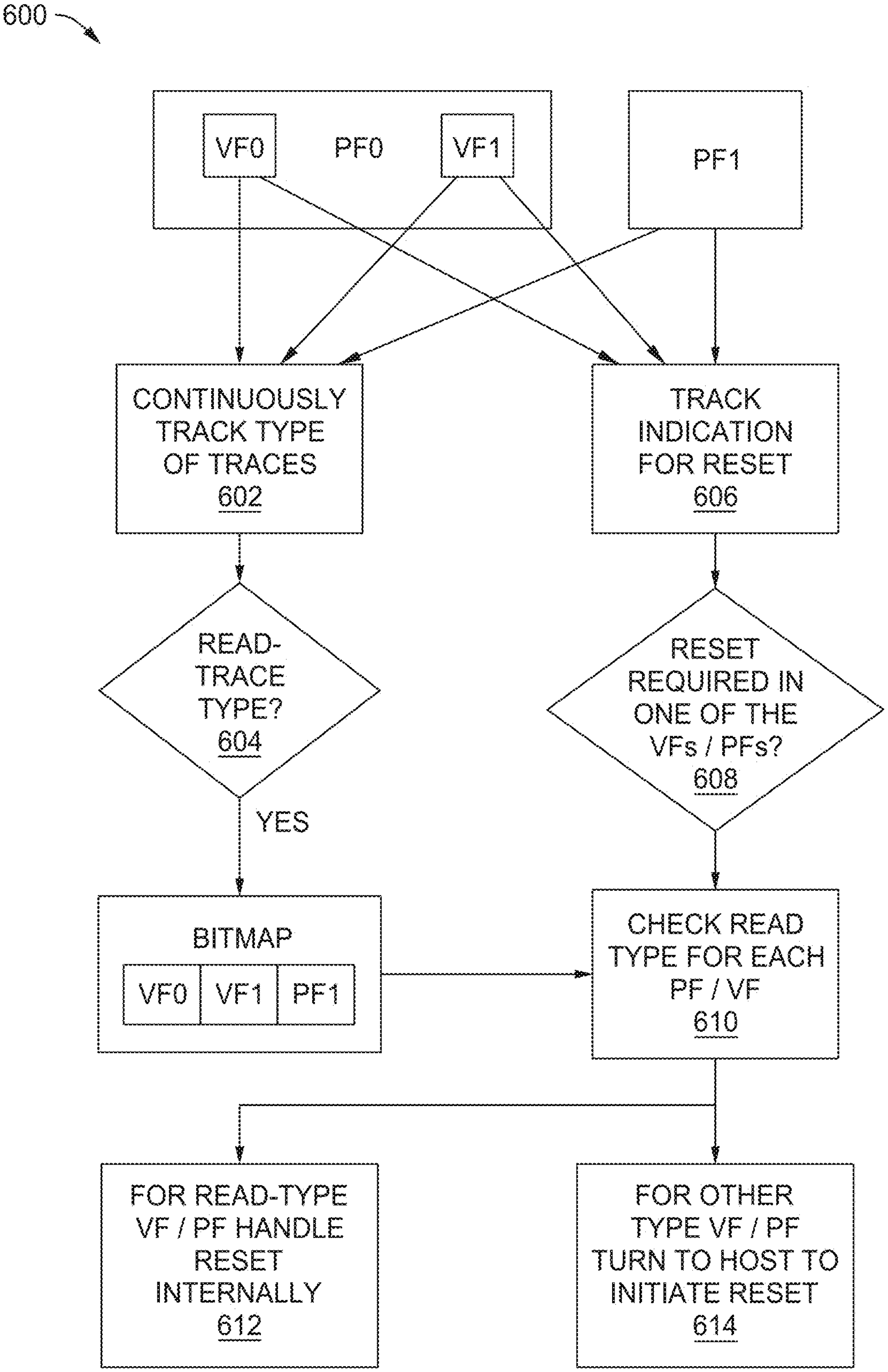
FIG. 6 is a flowchart illustrating panic event mitigation in a multi-tenant system.
Figure 7:
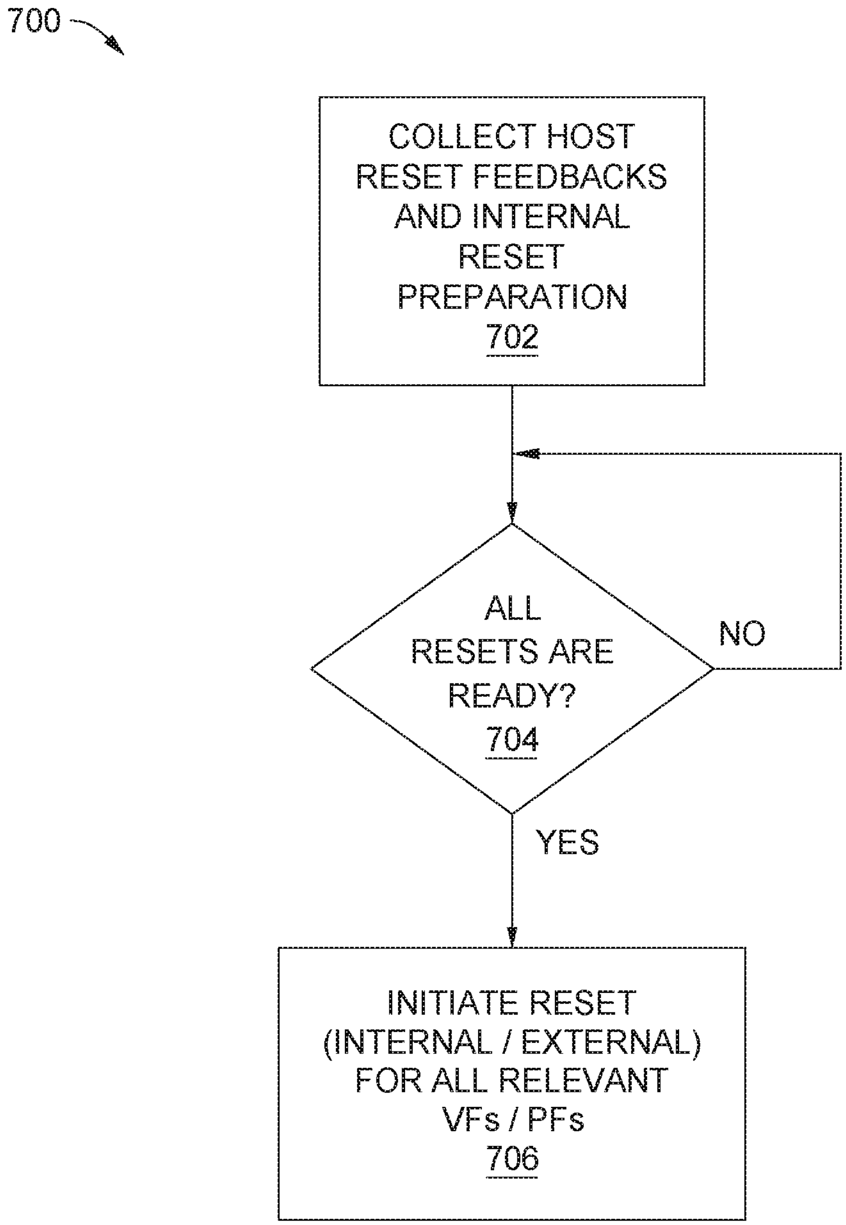
FIG. 7 is a flowchart illustrating selective reset preparation for a multi-tenant system.

A flowchart of the main embodiment is shown in FIGS. 6 and 7. FIG. 6 is a flowchart 600 illustrating panic event mitigation in a multi-tenant system. FIG. 7 is a flowchart 700 illustrating selective reset preparation for a multi-tenant System.

Generally speaking, the interface with multiple host devices should be considered because while one host device can have one workload and another host device can have a different workload, and how the different workloads are managed should be considered and managed. The bottom line should be to reduce the number of times to interact with the host device for panic events.

FIG. 6 shows a multitenant system. There are two PFs, PF0 and PF1. PF0 has two VFs, VF0 and VF1. Of course, the disclosure is not to be limited to two PFs and two VFs as other combinations are contemplated. On the left hand side of FIG. 6 at block 602, it is shown that the controller continuously tracks the types of traces at block 602, such as whether there is a read workload or a write workload as determined at block 604. The controller will track the workload for each PF and each VF in the system and mark, for example, a bitmap. The bitmap is a very simple bitmap and simply indicates whether there is a read extensive workload or not. For better flexibility, other things can be considered for whether to apply the panic mode or not such as any special administrative commands which the data storage device would prefer to not have host device involvement. Temperature is another possibility.

On the right had side, the controller tracks the indication for a reset at block 606. A determination is made regarding whether there is a failure at block 608 and whether a reset is necessary for the failure for at least one of the PFs or VFs in order to recover from the operation. If yes, then the bitmap is checked at block 610 for the read type for each PF and VF. If it is a read type VF or PF then the reset can be handled internally in the data storage device at block 612, but for other types of VFs/PFs, the host device is used to initiate a reset at block 614.

In case of having multiple failures, or a failure that is going to affect multiple VFs or PFs in the system, the system will wait for the reset as shown in FIG. 7. Specifically, the controller will collect host reset feedbacks and internal reset preparation will begin at block 702. A determination will be made at block 704 regarding whether all resets are ready. If not, then the controller waits. If yes, then the reset is initiated for all relevant VFs/PFs at block 706.

For example, one VF will handle a failure with the panic mode and the other VF will handle a failure without the panic mode and without updating or interacting with the host device. If there are multiple functions, VF and/or PF, that are going to be affected or if there is going to be a reset because of the failure, synchronization should occur. Even if one VF requires the host device to reset and another VF can deal with the failure internally, the reset will wait because the VF that can handle the failure internally is not ready for the reset. Therefore, the host device reset will wait until all VFs are ready, and then everything will be reset all at once.

Figure 8:
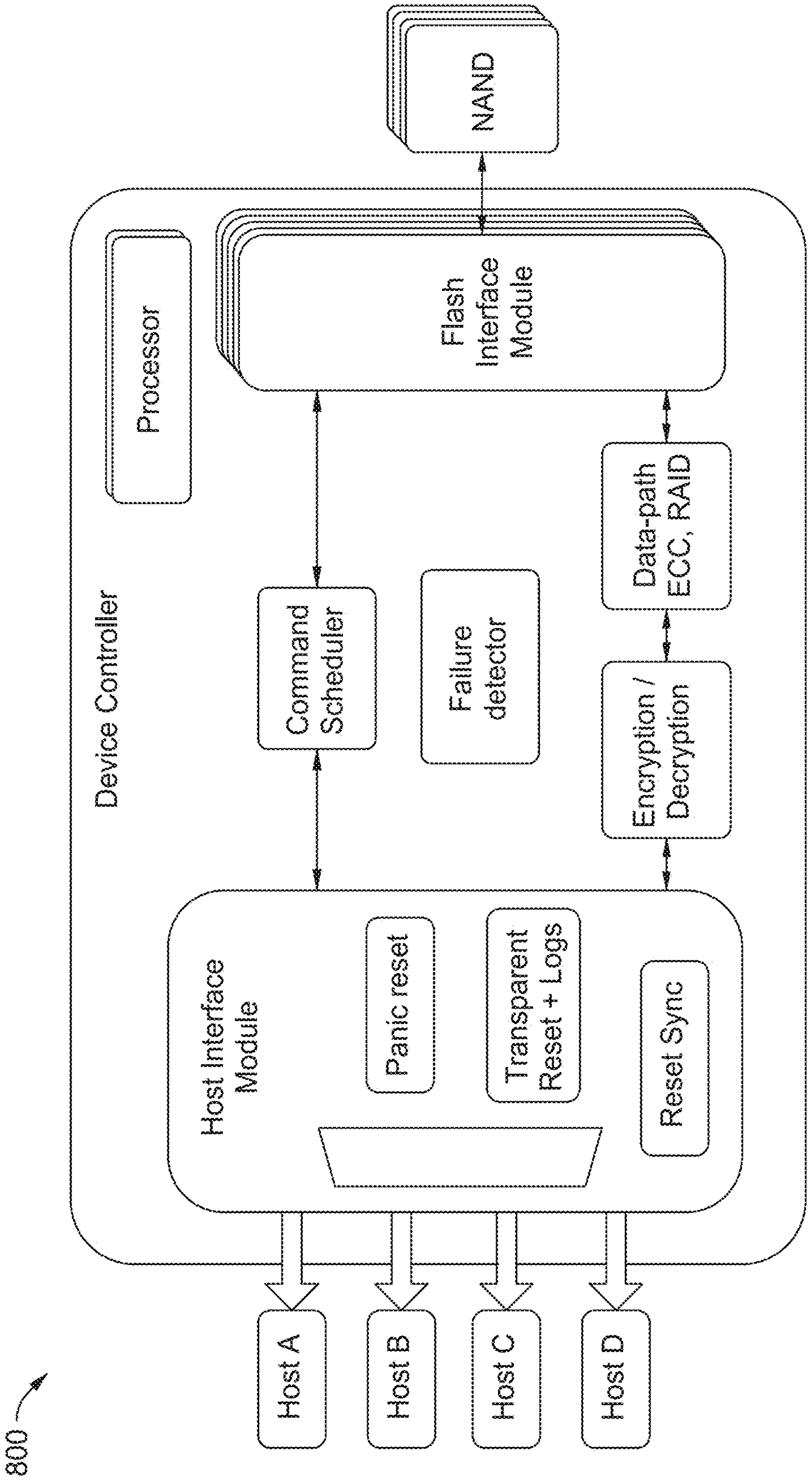
FIG. 8 is a schematic illustration of a memory system having panic event mitigation resources.

FIG. 8 is a schematic illustration 800 of a memory system having panic event mitigation resources. FIG. 8 depicts the high-level block diagram of the system addressed by this invention. In this example, device controller supports multi-host PCIe configuration (4 PCIe ports). The failure detector engine is responsible for detecting such failures. It interacts with the Panic Reset and Transparent Reset modules to communicate with each of the hosts depending on the workload. The reset sync module is responsible for synchronizing the messages and issues a single reset to the device controller when all tenants are ready.

The device controller is coupled to multiple host devices in FIG. 8, hosts A-D, and we have the HIM, the failure detector that detects those kinds of failures in the device controller and the two modes, the panic reset or the transparent reset. There are logs that are for sending to the host devices and logic that is responsible for the synchronization between the VFs that are going to get the reset because of the operations.

Panic mitigation will reduce the number of resets that require host device involvement, not only for single-port memory devices, but also for multi-tenant devices such as those used in the enterprise compute or automotive markets. Panic mitigation will allow achieving the improvement of system restoring in case of failure at one or more of the relevant VFs/PFs. In case of failure, the system will be able to restore the system state and continue operation.

In one embodiment, a data storage device comprises: a memory device; and a controller coupled to the memory device, wherein the controller is configured to: track an indication for reset for one or more physical functions (PFs), one or more virtual functions (VFs), or a combination of PFs and VFs; determine whether a reset is to occur; determine whether a workload is a read workload; and determine whether to handle a reset internally or turn to a host device to initiate a reset. The one or more PFs, the one or more VFs, or the combination of PFs and VFs comprises a first PF and a second PF, wherein the first PF comprises a first VF and a second VF. The controller is configured to determine that the workload is a read workload and wherein the controller is configured to handle the reset internally. The controller is configured to determine that the workload is other than a read workload and wherein the controller is configured to turn to the host device to initiate the reset. The controller is configured to collect reset feedbacks and internal reset preparations, wherein the controller is configured to determine whether all resets are ready, and wherein the controller is configured to initiate reset for all relevant VFs and PFs. The initiated reset is both internal and external. The controller is configured to track types of traces. The controller is configured to store an indication of whether a workload is a read workload for each of the one or more PFs, the one or more VFs, or the combination of PFs and VFs. The controller comprises a failure detector. The controller comprises a host interface module (HIM) that includes a panic reset module, a transparent reset and logs module, and a reset synchronization module.

In another embodiment, a data storage device comprises: a memory device; and a controller coupled to the memory device, wherein the controller is configured to: operate as a multitenant device coupled to one or more physical functions (PFs), one or more virtual functions (VFs), or a combination of PFs and VFs; track traces for each function of the one or more PFs, the one or more VFs, or the combination of PFs and VFs; determine whether the traces are for a read workload; and store an indication of whether the workload is a read workload. The controller is configured to determine that a reset should occur and handle the reset internally for functions having read workloads. The controller is configured to determine that a reset should occur and turn to a host device to initiate the reset for functions having other than read workloads. The tracking is performed continuously. The tracking is performed by determining a current workload for each PF of the one or more PFs, each VF of the one or more VFs, or each VF and PF of the combination of PFs and VFs once reset is indicated. At least one PF comprises a plurality of VFs. The storing comprises storing values in a bitmap indicating whether the workload is a read workload or an other than read workload.

In another embodiment, a data storage device comprises: means to store data; and a controller coupled to the means to store data, wherein the controller is configured to: determine that a near failure event has occurred; determine that the near failure event can be handled without host device reset; initiate host device isolation; handle state reset; restore system state from a state recovery database; and remove host device isolation. The controller comprises a failure indication module and a failure recovery module, and wherein the controller maintains the state recovery database. The controller operates as a multitenant device coupled to one or more physical functions (PFs), one or more virtual functions (VFs), or a combination of PFs and VFs.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
- a memory device; and
- a controller coupled to the memory device, wherein the controller is configured to:
  - operate as a multitenant device coupled to one or more physical functions (PFs), one or more virtual functions (VFs), or a combination of PFs and VFs;
  - track traces for each function of the one or more PFs, the one or more VFs, or the combination of PFs and VFs;
  - determine whether the traces are for a read workload; and
  - store an indication of whether the workload is a read workload, wherein the controller is configured to determine that a reset should occur and handle the reset internally for functions having read workloads.

2. The data storage device of claim 1, wherein the one or more PFs, the one or more VFs, or the combination of PFs and VFs comprises a first PF and a second PF, wherein the first PF comprises a first VF and a second VF.

3. The data storage device of claim 1, wherein the controller is configured to collect reset feedbacks and internal reset preparations, wherein the controller is configured to determine whether all resets are ready, and wherein the controller is configured to initiate reset for all relevant VFs and PFs.

4. The data storage device of claim 3, wherein the initiated reset is both internal and external.

5. The data storage device of claim 1, wherein the controller is configured to track types of traces.

6. The data storage device of claim 5, wherein the controller is configured to store an indication of whether a workload is a read workload for each of the one or more PFs, the one or more VFs, or the combination of PFs and VFs.

7. The data storage device of claim 1, wherein the controller comprises a failure detector.

8. The data storage device of claim 1, wherein the controller comprises a host interface module (HIM) that includes a panic reset module, a transparent reset and logs module, and a reset synchronization module.

9. A data storage device, comprising:
- a memory device; and
- a controller coupled to the memory device, wherein the controller is configured to:
  - operate as a multitenant device coupled to one or more physical functions (PFs), one or more virtual functions (VFs), or a combination of PFs and VFs;
  - track traces for each function of the one or more PFs, the one or more VFs, or the combination of PFs and VFs;
  - determine whether the traces are for a read workload; and
  - store an indication of whether the workload is a read workload, wherein the controller is configured to determine that a reset should occur and turn to a host device to initiate the reset for functions having other than read workloads.

10. The data storage device of claim 9, wherein the tracking is performed continuously.

11. A data storage device, comprising:
- a memory device; and
- a controller coupled to the memory device, wherein the controller is configured to:

operate as a multitenant device coupled to one or more physical functions (PFs), one or more virtual functions (VFs), or a combination of PFs and VFs;

track traces for each function of the one or more PFs, the one or more VFs, or the combination of PFs and VFs;

determine whether the traces are for a read workload; and store an indication of whether the workload is a read workload, wherein the tracking is performed by determining a current workload for each PF of the one or more PFs, each VF of the one or more VFs, or each VF and PF of the combination of PFs and VFs once reset is indicated.

12. The data storage device of claim 11, wherein at least one PF comprises a plurality of VFs.

13. The data storage device of claim 11, wherein the storing comprises storing values in a bitmap indicating whether the workload is a read workload or an other than read workload.

* * * * *